United States Patent [19]

Czeiler et al.

[11] Patent Number: 4,689,172

[45] Date of Patent: Aug. 25, 1987

[54] PROCESS OF SURFACE TREATING LUMINESCENT MATERIALS

[75] Inventors: András Czeiler, Budapest; Sándor Lukács, Verőcemaros; Tamás Palotai, Budapest; Tibor Lakatos, Budapest; György Bákdos, Budapest, all of Hungary

[73] Assignee: Tungsram Reszvenytarsasag, Budapest, Hungary

[21] Appl. No.: 863,109

[22] Filed: May 14, 1986

[30] Foreign Application Priority Data

Jul. 4, 1985 [HU] Hungary .............................. 2599/85

[51] Int. Cl.$^4$ ............................................ C09K 11/02
[52] U.S. Cl. .................... 252/301.36; 252/301.4 R; 252/301.4 P; 427/67; 427/212; 427/215; 427/220
[58] Field of Search ............... 427/212, 215, 220, 67; 252/301.36, 301.4 R, 301.4 P

[56] References Cited

U.S. PATENT DOCUMENTS

| | | | |
|---|---|---|---|
| 2,227,305 | 12/1940 | Grossman | 252/301.36 |
| 2,298,968 | 10/1942 | Roberts et al. | 252/301.36 |
| 2,686,158 | 8/1954 | Jones | 252/301.36 |
| 2,749,251 | 6/1956 | Shapiro | 252/301.36 |
| 3,310,418 | 3/1967 | Friedman et al. | 427/67 |
| 3,676,177 | 6/1972 | Hammond et al. | 252/301.36 |
| 3,963,639 | 6/1976 | Klein | 252/301.36 |
| 4,121,132 | 10/1978 | Repsher | 427/67 |
| 4,331,553 | 5/1982 | Fan et al. | 252/301.36 |

FOREIGN PATENT DOCUMENTS

| | | |
|---|---|---|
| EP-A1 0119041 | 9/1984 | European Pat. Off. . |
| 929924 | 7/1955 | Fed. Rep. of Germany . |
| 1142673 | 1/1963 | Fed. Rep. of Germany . |
| 501624 | 3/1939 | United Kingdom . |
| 733318 | 7/1955 | United Kingdom . |

Primary Examiner—Arthur P. Demers
Attorney, Agent, or Firm—Michael N. Meller

[57] ABSTRACT

The luminescent material(s) optionally composed of more color components are suspended in the solution of active agent(s) and treated with 0.5 to 10% by weight of glass forming acid or a mixture thereof, preferably boric acid or phosphoric acid calculated on the weight of the luminescent material. Then a solution comprising 1 to 15% by weight of aliphatic amines calculated on the weight of the luminescent materials is added and the mixture thus obtained is homogenized.

11 Claims, No Drawings

PROCESS OF SURFACE TREATING LUMINESCENT MATERIALS

TECHNICAL FIELD

The present invention relates to a novel process for the surface treatment of luminescent materials (luminophores) used for the electrostatic coating of discharge vessels applied especially in low-pressure mercury vapor discharge lamps.

The luminescent materials treated according to the invention can preferably be used for coating the envelopes of the new, wide-spread, so-called compact fluorescent lamps. However, they are useful for coating the envelopes of the usual fluorescent lamps of 38 mm diameter and the envelopes of the energy-saving fluorescent lamps of 26 mm diameter as well.

BACKGROUND ART

The application of the red, green and blue components of the luminescent materials comprising rare earth metals developed for achieving a higher lumen/watt (lumerg) efficiency in the envelope is not difficult by the commonly used wet methods. The components may be applied in the desired ratio to the inner wall of the discharge vessel by suitably adjusting the viscosity and density of the coating suspension. Although carbon or carbonized organic substance contaminations having a disadvantageous effect on the efficiency of the luminescent material and the gas content of the discharge tube can remain even after the usual heat treatments when the luminescent material is applied as an organic solution by using nitrocellulose as binding agent, the disadvantageous effects occure more frequently when the luminescent material is applied in the form of an aqueous solution. The removal of the binding agent is also more difficult compared to the removal of nitrocellulose, when the luminescent material is applied in the form of an aqueous solution.

The discharge tubes of 26 mm diameter of the energy-saving fluorescent lamps are generally coated by two coating layers in order to save money. First the aqueous solution of the usual halophosphate luminescent material is applied onto the inner wall of the discharge tube. Thereafter the organic solvent solution of the luminescent material comprising rare earth metal is applied. All the disadvantageous features of the wet methods occur when this procedure is used.

In order to eliminate the drawbacks of the wet methods, the method of electrostatic coating was worked out. This method is used for the preparation of e.g. low-pressure discharge vessels and described by e.g. U.S. Pat. Nos. 2,426,016 and 4,081,714 and Hungarian patent specification No. 184,030.

According to U.S. Pat. No. 2,426,016 very finely dispersed silicic acid is used in the course of the electrostatic coating of high-pressure mercury vapor discharge tubes in order to enhance the adhesion between the luminescent material and the glass. However, this compound cannot be used for preparing low-pressure discharge tubes wherein the discharge arc directly contacts the luminescent material as the finely dispersed silicic acid is disadvantageous from the point of view of light efficiency and life-time due to its gas permeability and mercury binding ability.

This drawback is aimed to be avoided by U.S. Pat. No. 4,081,714 which shows a process wherein calcium stearate or -palmitate or stearic acid and palmitic acid together with the nitrate of strontium or calcium are used for the surface treatment and adhesion enhancing of luminescent materials, while finely dispersed aluminium oxide is used for assuring the sprayability. The use of calcium stearate together with calcium nitrate binding agent is disadvantageous from the point of sprayability as the latter compound is hygroscopic. The adhesion of the coating has to be assured by vaporization. In the course of this step the bulb having been previously heated to a temperature of 200° C. has to be cooled and thereafter wetted by overheated vapor of about 200° C. temperature. The result of the use of the hygroscopic aluminium oxide can be the same as the use of the finely dispersed silicic acid since the absorbed water cannot be completely removed by the heat treatments generally used in the course of the production of low-pressure mercury vapor discharge tubes. Also, since the salts of stearic or palmitic acid cannot also completely be removed by the heat treatments, it has to be taken account that some contamination will always remain in the coating.

The present invention is intended to eliminate the drawbacks of the above-described methods occuring in the course of the production of low-pressure discharge tubes. Therefore the efforts were directed toward working out such a coating method which on the one hand facilitates the faultless electrostatic application of the luminescent material and results in a perfect quality of the coating, and on the other hand assures good adhesion of the coating to the glass by the aid of the binding agent remaining on the particles of the luminescent material and assures the removal of gas permeable or other disadvantageous substances.

SUMMARY OF THE INVENTION

The subject of the invention is a process for the surface treatment of luminescent materials used for electrostatic coating. In the course of the said process the luminescent material or materials optionally composed of more components according to the desired color composition, suspended in solution(s) comprising active ingredients, homogenized, dried, powderized and used for electrostatic coating in a manner known per se.

According to the invention the above aims are achieved when the suspension of the luminescent material(s) is treated with 0.5 to 10% by weight of a glass-forming acid, preferably boric acid and/or phosphoric acid calculated on the weight of the luminescent material(s). Thereafter 1–15% by weight of aliphatic amine(s) calculated for the weight of the luminescent material are added to the homogenized mixture in the form of a solution, thereafter the mixture thus obtained is homogenized.

DETAILED DESCRIPTION OF THE INVENTION

According to the invention in the course of suspension the luminescent materials are treated with acids the anhydrides of which are susceptible to the forming of low melting glasses. Onto the acid-treated particle surfaces aliphatic amines are adsorbed. According to the invention not only halophosphate luminescent materials, but luminescent materials composed of two or more components, comprising rare earth metal oxides can be treated and used for electrostatic coating as well.

The process of the invention has three advantages:

the double acid-alkylamine layer makes the particles hydrophobic, thus the luminescent material becomes easily sprayable and dischargable in the course of the heat treatment forming part of the manufacturing process the amine is removed and evaporated without leaving any disadvantageous carbonaceous contaminations the glass-forming oxide liberating during the heat treatment adheres the particles together and to the glass.

As glass-forming agents preferably boron trioxide or phosphorous pentoxide can be used as they do not harmfully influence the gas and mercury content of the low-pressure mercury discharge tubes (fluorescent lamps). Boric acid and/or phosphoric acid are applied per se or in alcoholic especially ethanolic solutions onto the surface of the luminescent materials. Then the adsorbed acid coating is transformed into a "salt" by adding an ester or ketone, especially acetone or ethyl acetate, solution of aliphatic amines. As aliphatic amines preferably amines of 1 to 8 carbon atoms, especially n-butylamine and n-octylamine are preferred.

The double layer thus formed on the particles of the luminescent material imparts a hydrophobic character to the luminescent material. The powder can be easily sprayed, discharged electrostatically and it melts at a lower temperature which enhances the adhesion of the layer. In order to achieve the appropriate effect, the oxides or the acids which can be derived therefrom are applied onto the surface of the luminescent material or a mixture of luminescent materials in an amount of 0.5 to 10% by weight, while the alkylamines are applied in an amount of 1-15% by weight. Care has to be taken of the formation of neutral or alkaline "salts".

The invention is illustrated by the following non-limiting examples.

EXAMPLE 1

Into a flask 150 g of Toshiba SPD5D green luminescent material (granule size: 1 to 6 μm), 100 g of Toshiba SPD7A red luminescent material (granule size: 1 to 6 μm) and 250 $cm^3$ of alcoholic boric acid solution comprising 5% by weight of $B_2O_3$ are charged. The suspension is homogenized by a disk stirrer taking care to avoid cracking of the particles of the luminescent material. After homogenization 30 $cm^3$ of n-butylamine dissolved in 250 $cm^3$ of acetone are charged to the suspension under constant stirring and the homogenization is continued. The slurry thus obtained is poured into a china dish, evaporated and dried in a vacuum drying oven. The dry, solidified substance is ground in a ball or air blast mill into a particle size of 2 to 10 μm.

EXAMPLE 2

Into a baker 10 g of Sylvania blue luminescent material (particle size: 1 to 6 μm), 70 g of Sylvania green luminescent material (particle size: 1 to 6 μm), 170 g of Sylvania red luminescent material (particle size: 1 to 6 μm) and 250 $cm^3$, 3% by weight of phosphoric acid solution are charged. The procedure of Example 1 is followed and then, thereafter 35 $cm^3$ n-octylamine dissolved in 250 $cm^3$ of ethyl acetate are added. Then the procedure of Example 1 is followed again. Thus a luminescent material suitable for the formation of a so-called three-stripped luminescent material (luminophore) coating can be obtained.

EXAMPLE 3

A suspension is prepared according to examples 1 and 2 by charging the following components:

250 g of halophosphate luminescent material

100 $cm^3$ of alcoholic boric acid solution comprising 5% by weight of $B_2O_3$

100 $cm^3$ of ethanol.

To this suspension 20 $cm^3$ of n-butylamine dissolved in 250 $cm^3$ of acetone are charged. Then the procedure of the preceding examples is followed.

Finally a luminescent material suitable for the preparation of the halophosphate luminescent material coating for bulbs of discharge vessels 38 mm and 26 mm is diameter (energy-saving and normal luminescent lamps) by an electrostatic method is obtained.

The weight ratios of the luminescent materials in the preceding examples mean a possible embodiment of the invention. According to the color requirements, the weight ratio of the luminescent materials (luminophores) can be varied within wide ranges, which is well-known for a man skilled in the art. The weight ratio of the "glass-forming" oxides in the mixture and the weight ratio compared to each other can also be varied in accordance with the geometric requirements of the discharge vessel.

We claim:

1. A process of surface treating a luminescent material which comprises treating a suspension of at least one luminescent material with 0.5 to 10% by weight of a glass-forming acid or a mixture thereof calculated on the weight of the luminescent material, and thereafter adding a solution comprising 1 to 15% by weight of at least one aliphatic amine calculated on the weight of the luminescent material.

2. A process as claimed in claim 1 which comprises mixing n-butylamine dissolved in acetone to a suspension of ethanolic boric acid and the luminescent material.

3. The process as claimed in claim 1 which comprises mixing n-octylamine dissolved in ethyl acetate to the suspension of ethanolic phosphoric acid and the luminescent material.

4. The process as claimed in claim 1 which comprises mixing n-butylamine dissolved in acetone to a suspension of ethanolic boric and phosphoric acid.

5. The process as claimed in claim 1, wherein the glass-forming acid is selected from the group consisting of boric acid and phosphoric acid and mixtures thereof.

6. The process as claimed in claim 1, wherein the glass-forming acid is in an alcoholic solution.

7. The process as claimed in claim 6, wherein the alcoholic solution is an ethanolic solution.

8. The process as claimed in claim 1, wherein the aliphatic amine is added as a solution in a solvent selected from the group consisting of esters and ketones.

9. The process as claimed in claim 8, wherein the ester is ethyl acetate and the ketone is acetone.

10. The process as claimed in claim 1, wherein the alkylamine contains from 1 to 8 carbon atoms.

11. The process as claimed in claim 10, wherein the alkylamine is selected from the group consisting of n-butylamine and n-octylamine.

* * * * *